Aug. 29, 1944. A. C. OAKES 2,356,877
AUTOMATIC CUTTING APPARATUS
Filed Oct. 20, 1942
Fig. 1.
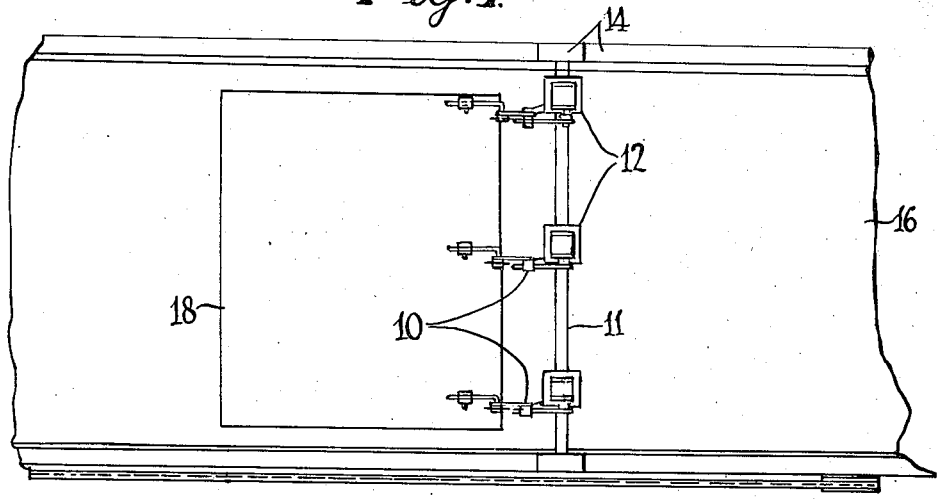
Fig. 2.
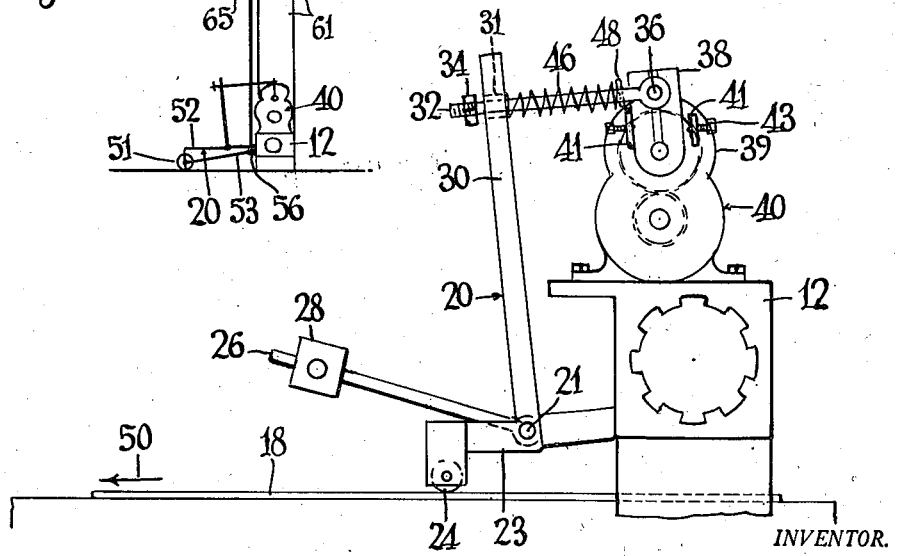
Fig. 3
INVENTOR.
ALFRED C. OAKES
BY Olen E. Bee
ATTORNEY.

Patented Aug. 29, 1944

2,356,877

UNITED STATES PATENT OFFICE 2,356,877

AUTOMATIC CUTTING APPARATUS

Alfred C. Oakes, Mount Vernon, Ohio, assignor to Pittsburgh Plate Glass Company, Allegheny County, Pa., a corporation of Pennsylvania Application October 20, 1942, Serial No. 462,704

5 Claims. (Cl. 33—32)

This invention relates to cutting apparatus for dividing sheet glass into panes or strips and it has particular relation to electrically controlled cutters automatically operable in connection with the operation of glass handling apparatus.

The apparatus disclosed herein relates to further developments of the type of cutting apparatus described in United States Patent No. 2,278,273, dated March 31, 1942.

One object of the invention is to provide an improved apparatus insuring uniform pressure of glass cutting elements in connection with relatively high speed cutting operations.

Another object of the invention is to provide an improved cutting apparatus in which weights and electric energy are combined to control the actuation of cutting elements to and from operative position.

According to the disclosure in the patent above identified, the energy of an electric motor is employed to apply a cutting element to a glass surface and thereby insure uniformity of cutting. This arrangement operates very satisfactorily with reference to edge trimming of glass for which the structure was primarily designed. However, in paning glass, that is, cutting it by the use of multiple cutters properly spaced and under which glass is transported at higher speed, difficulty has been experienced in applying the cutter properly to the fast moving glass without causing a skipping or bouncing action of the cutter element before it settles down to its normal cutting position. It is to be understood that the application of cutting pressure with reference to glass is somewhat critical. It was found that if the energy of the motor were regulated properly for efficient cutting pressure, such pressure was not sufficient to prevent skipping of the cutter when first applied and furthermore, there was not sufficient power in the motor to respond with required rapidity to actuate the cutter mechanism properly at higher speeds, particularly in lifting the cutter from the work. On the other hand, if higher powered motors were employed, the cutter would gouge too deeply into the glass with unfavorable cutting results as well as premature destruction of the cutting element.

With these disadvantages in view, an electric motor and weighted cutter have been combined by the use of which the motor operates to lower the cutter to the work and then by mechanical transfer, the weight applies the cutting pressure while the energy of the motor is directed against a stop. There is sufficient play or lost motion in the connections between the motor and cutter to insure these conditions. The motor, however, is so powered as to respond satisfactorily in lifting the cutter to its inoperative position. The operation of the motor is automatic and is electrically controlled in substantially the same manner as that described in the patent above referred to.

In the drawing:

Fig. 1 is a fragmentary diagrammatic plan of a conveyor and cutting device; Fig. 2 is a diagrammatic elevation of a cutting apparatus including an electric wiring diagram; and Fig. 3 is a side elevation on a larger scale of a cutting apparatus.

In practicing the invention, cutter units 10 are mounted upon a horizontal beam 11 having motor-supporting blocks 12 mounted thereon. Frame members 14, designed to carry a driven conveyor 16, rigidly support the beams 11 transversely thereof and at an elevation sufficient to insure proper travel of sheet glass 18 upon the conveyor disposed thereneath.

Each cutter unit 10 includes a lever 20 which has a pivotal connection 21 securing it upon the block 12 on the horizontal beam. An arm 23 of the lever carries a cutter 24 which is adapted to be lowered upon the sheet glass 18 as the latter is transported upon the conveyor. A second arm 26, which can be a continuation of the arm 23 or a rigid portion of the lever, supports a weight 28 adjustably mounted thereon at a suitable distance from the pivotal connection 21, preferably at a distance greater than the distance of the cutter 24 from the pivotal connection. An upright arm 30 of the lever on the side of the connection 21 away from the cutter has an opening 31 formed therein, through which an end portion of a rod 32 is loosely slidable, and a nut 34 is threaded upon the outer end of the rod to limit movement of the arm toward the end of the rod. The opposite or inner end of the rod 32 has a pivotal connection 36 securing it to a crank arm 38 of a reduction gearing 39 which forms a part of the drive of a reversible electric motor unit 40. Stop lugs 41 mounted rigidly upon the motor unit on opposite sides of the crank arm permit limited movement of the crank in opposite directions. The extent of this movement can be varied by means of stop bolts 43 threaded through the lugs 41. A compression spring 46 which is coiled about the rod 32 is confined between the lever arm 30 and a pin 48 secured upon the rod. From this description, it will be apparent that there is a lost motion connection between the motor unit 40 and the lever 20.

As the sheet glass 18 is advanced in the direction indicated by the arrow 50, its front edge strikes a roller 51 journaled upon the outer end of a lower arm 52 of a bell crank 53 which has its intermediate portion pivotally mounted, as indicated at 56, upon a block 12. The upper end of the bell crank is disposed in a slotted end portion 58 of a switch-operating arm 60 that is pivoted upon an upright support 61 carried upon the block 12. A reversing switch 63 connected to the arm 60 is thus operable by the bell crank 53. The switch 63 is included in an electric circuit as illustrated in the diagram 64 (Fig. 2). As the leading edge of the glass strikes and raises a roller 51, the switch is actuated and the reversible motor is operated to apply rotative force to the crank 38 in a counterclockwise direction (Fig. 3). In response to this action, the cutter is lowered until the rod 32 slides through the opening 31 and under the influence of the weight 28, the cutter rests upon the glass surface. The extent of movement of the crank 38 is such that the rod moves freely through the slot 31 and the nut 34 is out of contact with the outer side of the arm 30. In this position the coil spring 46 exerts pressure upon the arm 30 for the purpose of damping vibrations, although the principal force of pressing the cutter upon the glass is exerted by the weight 28. The spring 46 thus serves to steady the operation and to prevent vibrations from being set up in the lever 20 as a result of the sudden application of the cutter to the glass.

When the roller 51 drops from the trailing edge of the sheet glass, a tension spring 65 having its opposite ends connected to the bell crank 53 and the support 61 returns the switch 63 to its original position; that is, to the full line position shown in Fig. 2. The spring 65 constantly exerts force tending to pivot the bell crank so as to maintain the roller 51 against the conveyor or glass and to maintain the switch in the position indicated. In this position of the switch, the motor unit 40 exerts force tending to rotate the crank 38 in a clockwise direction, thereby to actuate the lever 20 to such position as to hold the cutter 24 free from contact with and above the path of movement of the glass. The stop bolt 43 is so adjusted that the cutter is placed as near as practicable to the path of movement of the glass and this stop positively resists the energy generated by the motor through the crank 38. A rheostat 68 is included in the electric circuit to regulate the force to be applied by the motor.

Although only one form of the invention has been shown and described in detail, it will be apparent to those skilled in the art that the invention is not so limited, but that various changes can be made therein without departing from the spirit of the invention or from the scope of the appended claims.

I claim:

1. In a cutting apparatus, an arm having a cutter thereon, means for pivotally supporting the arm, a weight on the arm exerting force to press the cutter upon the work to be cut, a motor having a cutter-actuating crank member thereon, and a lost motion connection between said member and the arm providing for appreciable difference between the travel of said member and the arm actuated thereby and responsive to operation of the motor to actuate the cutter toward and away from the work.

2. In a cutting apparatus, an arm having a cutter mounted thereon, means for pivotally supporting the arm, a weight on the arm for pressing the cutter into cutting engagement with work to be cut, a reversible motor having an actuating crank member thereon, said motor having stops in the path of movement of the actuating member to restrict movement of the latter within the predetermined limits, and a lost motion connection between said actuating member and said arm providing for appreciable difference between the travel of said member and the arm actuated thereby and responsive to operation of the motor to lower the cutter into contact with the work under the influence of the weight.

3. In a cutting apparatus, a lever having a cutter-supporting end portion, means for pivotally supporting the lever intermediate its ends, a weight adjustably mounted on said lever on the same side of the pivotal means as the cutter-supporting end portion to press the latter downwardly toward work to be cut, a reversible motor unit including a driven crank, stops on the motor unit in the path of the crank to restrict movement of the latter within predetermined limits, a member connected to the crank and extending slidably through the end portion of the lever opposite the cutter-supporting end portion, a stop on the end of said member to actuate the lever in one direction in response to the operation of the motor unit in one direction and said member being freely slidable through the lever in the other direction of operation of the motor unit.

4. In a cutting apparatus, a reversible motor unit including a driven crank, stops on the motor unit in the path of the crank to restrict movement of the latter within predetermined limits, an arm having a cutter thereon, a weight connected to the arm to press the cutter against work to be cut, a lost motion connection between the arm and crank providing for appreciable difference between the travel of said crank and the arm connected thereto and responsive to movement of the crank in one direction to lift the cutter out of contact with the work and responsive to movement of the crank in the opposite direction to lower the cutter to the work, and a spring under compression between said arm and crank.

5. In a glass cutting apparatus, a bell-crank lever having a substantially horizontal arm and an upright arm, a cutter mounted upon the horizontal arm adjacent the outer end of the latter, means for pivotally supporting the lever at the junction of said arms, said bell-crank having a rigid extension projecting outwardly beyond the end of the horizontal arm, a weight carried by said extension outwardly beyond the cutter and constantly exerting force tending to move the cutter downwardly upon work to be cut, a reversible motor having a lever actuating crank member thereon, said motor having stops thereon on opposite sides of the actuating member, and a lost motion connection loosely linking said actuating member to the lever providing appreciable difference between the travel of said member and the lever actuated thereby and responsive to operation of the motor in one direction to move the cutter into operative cutting position and permitting appreciable play before the motor operating in the other direction lifts the cutter from the operative cutting position.

ALFRED C. OAKES.